US006034311A

United States Patent [19]

Fisher, IV

[11] Patent Number: 6,034,311

[45] Date of Patent: Mar. 7, 2000

[54] HEIGHT ADJUSTABLE POINT RETENTION BAR ASSEMBLY

[76] Inventor: Charles H. Fisher, IV, P.O. Box 402, Coalport, Pa. 16627-0402

[21] Appl. No.: 09/005,126

[22] Filed: Jan. 9, 1998

[51] Int. Cl.$^{7}$ ........................ G01D 3/00

[52] U.S. Cl. ........................ 84/313; 84/307; 84/312 R

[58] Field of Search ........................ 84/313, 307, 312 R

[56] References Cited

U.S. PATENT DOCUMENTS 5,359,144 10/1994 Benson ........................ 84/313

*Primary Examiner*—Robert E. Nappi
*Assistant Examiner*—Kim Lockett
*Attorney, Agent, or Firm*—John S. Hale

[57] ABSTRACT

A height adjustable pivot point carrying device for a floating point tremolo, comprising: a base plate with a plurality of cylindrical seat housings extending the base plate. Each cylindrical seat housing defines a throughgoing bore and is threaded at its distal end to receive a threaded cap. A plurality of point support posts comprising a post and a conical pointed portion angularly extending from the post are slidably mounted in the cylindrical seat housing to pivotably receive a pivotable string carriage of the floating point tremolo on the conical pointed portion. An adjustment screw mounted in a threaded blind bore of the post moves the point support posts with respect to the base plate to raise or lower a pivotable string carrying portion of the floating point tremolo adjusting the height of the strings in relation to external surface of the musical instrument.

20 Claims, 6 Drawing Sheets

Fig.1
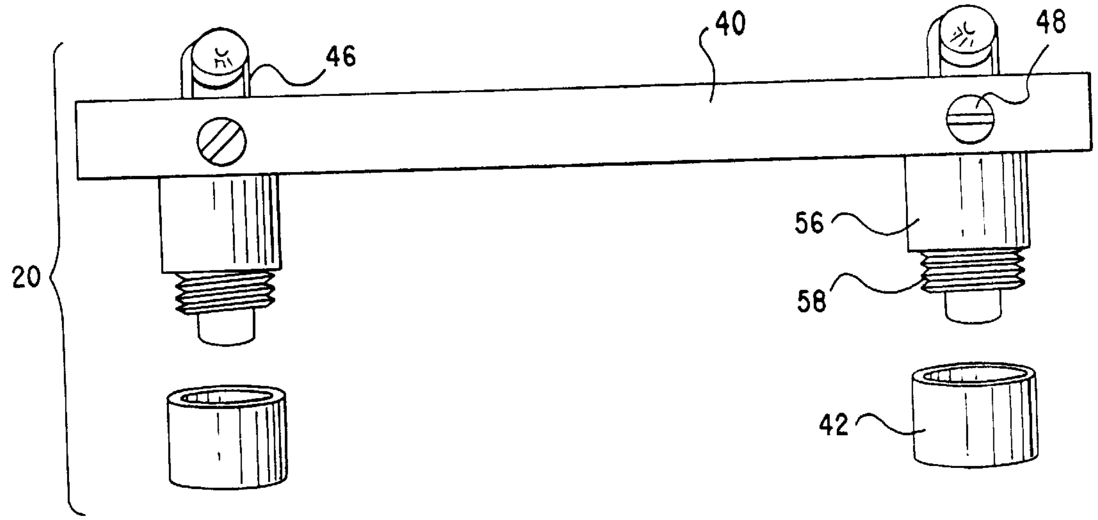
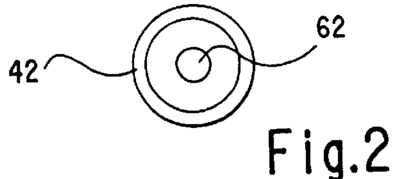
Fig.2
Fig.3
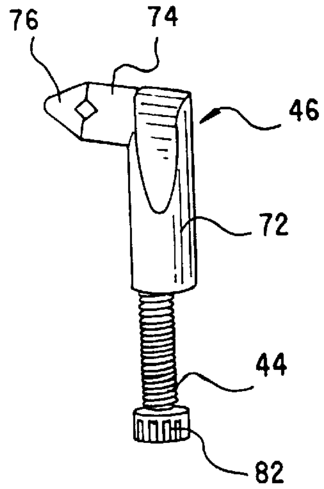
Fig.4
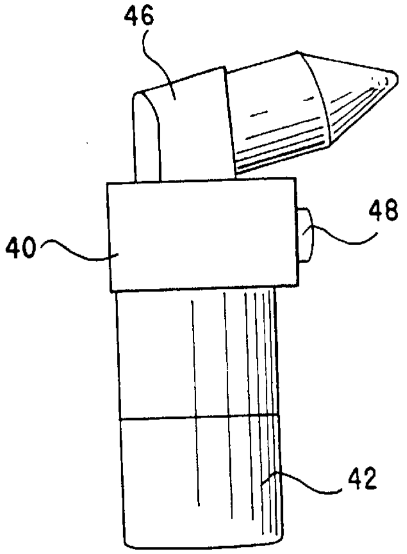

HEIGHT ADJUSTABLE POINT RETENTION BAR ASSEMBLY

FIELD OF THE INVENTION

The present invention relates generally to a device for raising the string height of a plurality of strings secured to a tremolo and more particularly is directed to a height adjustable point retention bar assembly that slidably supports a plurality of height adjustable pivot points which pivotably receive a pivoting portion of a floating tremolo assembly.

BRIEF DESCRIPTION OF THE PRIOR ART

Vibrato devices for stringed musical instruments are well-known in the prior art as evidenced by U.S. Pat. Nos. 5,429,962; 4,795,505; 4,724,737; 4,457,201; 3,466,962; 3,237,502; and by the British Patent Number 905,447.

U.S. Pat. No. 5,429,028, a patent issued to the present inventor, shows a floating one piece tremolo for a stringed instrument in which a carriage is pivotally mounted in a housing by means of a floating point mechanism. The carriage is biased against the housing by the action of the instrument strings and tremolo springs opposing each other. The carriage of the '028 device is spring biased and provided with string holding keys which are each provided with a locking screw to keep the string eyelet in place in an eyelet basin on each string holding key. This complex arrangement was eliminated by the present invention which provides a plurality of variably dimensioned through-going apertures on the rotatable portion of the tremolo to receive and hold the eyelets. The present improvement results in faster string attachment and removal and a more secure anchoring of the string eyelet. Furthermore, in this '028 embodiment of the floating point tremolo assembly, the points or conical tips were held by support members attached to the sides of the rectangular frame or housing. The present inventive tremolo assembly utilizes a point retention bar located below the surface of the instrument in the interior of the instrument.

Another U.S. Pat. No. 4,457,201 discloses a combined bridge and tailpiece assembly for a stringed musical instrument with a tailpiece member which is manually rotated to produce a vibrato effect. The tailpiece member is rotatably connected at its ends with the tailpiece block through screws. The screws are threaded into aligned openings of the tailpiece block with the smaller diameter portion of the screws passing through the central portion of ball bearing races mounted in opposite aligned longitudinal openings in a vertical leg portion to connect the vertical leg portion of the tailpiece member with the tailpiece block. Adjustable string attachment devices in the form of inset blocks, (one inset block for each of the instrument strings) are each provided with a thoroughgoing bore to receive a longitudinal rod which passes through aligned openings contained in the base and aligned bores formed in the inset blocks. Each inset block includes a hook portion which holds an eyelet portion of the instrument string end. The tailpiece member is spring biased in the opposite direction of rotation to resist the rotating force exerted on the tailpiece member by the tensioned strings, and at least one lever is connected with the tailpiece member for rotating the same relative to the tailpiece block during sounding of the instrument to produce a vibrato effect.

U.S. Pat. No. 3,237,502 discloses a vibrato unit for stringed instruments which includes an adjustable bridge for adjusting the pitch of individual strings. Similarly, U.S. Pat. No. 3,466,962 discloses a tremolo device having an eccentrically mounted cradle member which is rotated relative to a base plate to vary the tone of the sound of the strings. Another U.S. Pat. No. 4,795,505 shows a tremolo arm adjustment mechanism which affects the position and movement of a tremolo arm. The adjustment mechanism consists of an adjustment screw threadedly engaged in an end of a bore on the tremolo and a spring member compressedly disposed within the bore between the tremolo arm and the adjustment screw. The position of the screw within the bore can be adjusted to regulate both the height of the tremolo arm and the force the spring exerts on the end of the tremolo arm to moderate the torsional force exerted on the tremolo arm. U.S. Pat. No. 4,724,737 also discloses a tuning system for a vibrato guitar. The pivoting motion of the tuning system is facilitated by a pair of holes that are formed toward the front edge of the bridge plate which are formed into knife edges. The knife edges are pivotally coupled to corresponding pivot points of the heads of support screws which screw into brass anchors carried in the top surface of the body of the instrument.

British Patent Number 905,447 discloses a vibrato bridge with a base having a pivotal platform. A bridge is arranged on the platform adjacent the pivot and parallel to its axis, and string attachment means are attached to the platform at one side of the bridge and pivot. A lever arm is attached to the platform to pivot the same on the base to change the tension on the strings to produce a vibrato effect.

The point and cone mechanism of the present invention is more stable than the tremolos in the prior art and the action of the present inventive string height adjustment assembly gives the player greater control over the vibrato effect.

While the prior art devices allow the user to initially provide the desired musical result, they each possess certain inherent drawbacks which limit their versatility. In order to produce the versatility required from a vibrato device, it is necessary to be able to effectively and efficiently modulate the tension on the strings of the instrument to achieve the desired vibrato effect and to easily and quickly mount and replace new strings in the instrument. Control over the vibrato effect must be easy for a performer to attain and the device must not be awkward to use, time consuming to adjust, or appear bulky on the face of the instrument. The prior devices do not fulfill all these needs. As an example in U.S. Pat. No. 4,457,201, when the tailpiece member is rotated, tuning problems occur in that the string pitch changes and string breakage is accelerated. In view of the construction of this device, restringing is more difficult and setting intonation is not as easy as in the present invention.

The present invention was developed to provide a combined assembly which is quickly and easily secured to the body of a stringed musical instrument. The assembly has a clean, functional appearance which makes an attractive addition to the instrument while still being completely functional. The assembly includes a rotatable member on which the individual strings are removably mounted and string adjustment saddle mechanisms are disposed, the saddle mechanisms being moveable with respect to each other and characterized by linear and vertical adjustments to individually position each of the same with respect to the strings of the instrument. Furthermore, the vibrato effect produced by the inventive assembly is easily provided owing to the improved means of attaching the tremolo arm to the rotatably mounted portion of the tremolo which incorporates a novel inventive clutch assembly, and a simplified structure of the point and cone mechanism which is used to rotate the rotatable portion of the tremolo to vary the tension in the instrument strings.

SUMMARY OF THE INVENTION

The point and cone tremolo is greatly improved by the addition of the height adjustable point retention bar assembly allowing the user to easily raise or lower the height of the strings of the musical instrument while still enjoying all of the aforementioned benefits of using a tremolo which incorporates the point and cone process. The height of the adjustable point retention bar assembly is easily installed and once installed the player can raise or lower the string height by simply rotating two threaded fasteners with Allen-type heads. The threaded fasteners can be rotated without removing the back cover of the instrument and once adjusted, the point portions of the point and cone process remain in place because they are frictionally held in place.

The present invention features a novel height adjustable point retention bar for use with a pivoting portion of a tremolo for a stringed musical instrument. The height adjustable point retention bar assembly includes aligned point portions held in a position to serve as the pivot points for the pivotable tremolo. The aligned point portions of the height adjustable point retention bar assembly are well suited to be incorporated in a tremolo which achieves its pivoting action through a so-called point and cone process. The point and cone process basically uses a plurality of point structures secured to the body of a musical instrument to pivotably engage conical recesses on the pivoting portion of a tremolo. The points and cones are pivotably held together by a balanced tension provided by a plurality of instrument strings biasing the tremolo on one side of the pivot point and a plurality of springs biasing the tremolo on the other side of the pivot point. This type of tremolo is sometimes also referred to as a "floating point" tremolo.

The present invention is directed to a mechanism referred to as a height adjustable point retention bar assembly which can raise or lower the height of the point portions of the assembly with respect to the instrument body. This has the effect of raising or lowering the string height of the instrument because the strings are secured at one end to the pivoting portion of the tremolo. Raising and lowering string height has several advantages that are well known to guitarists and other stringed instrument players and these advantages include adjusting the height of the string over the frets of fretted instruments to accommodate different playing styles, the varying preferences of the instrument players and overcoming the buzzing associated with low string height. Finding a satisfactory mechanism to raise and lower the string height of a string instrument with a tremolo installed is a daunting task and has not been satisfactorily addressed in the musical instrument industry.

The present invention overcomes the technical problems associated with adjusting the string height of a tremolo instrument by providing a point retention bar with a plurality of support member seats, each of which holds the lower portion of a support member, the upper portion of which has integrally formed thereon an angular point portion. The lower or base portion of each support member has an internally threaded blind bore to receive a height adjustment screw which can be rotated in either direction until the screw head contacts an immovable surface. Further rotation of the height adjustment screw in same direction which caused the contact with the immovable surface will apply a translational force to the support member sufficient to move the support member along the axis of the blind bore. The ensuing movement of the support member relative to the height adjustable point retention bar and the instrument body to which it is attached effects the desired change in string height. Hence, the instrument player can adjust the string height of an instrument simply by turning a plurality of screws or similar threaded fasteners. This can be done without removing the back of the musical instrument if the back is appropriately cut out to accommodate a hand tool.

The height adjustable point retention bar assembly of the present invention can be used in many musical instruments including any solid body guitar, and most partially solid body guitars and most steel guitars.

It is an object of the present invention to provide the musician with a convenient mechanism to raise and lower the string height of a stringed instrument using a simple hand tool.

It is a further object of the present invention to provide a simple mechanism for raising and lowering string height when a pivoting tremolo is installed in the musical instrument, particularly a tremolo that incorporates a point and cone process.

Yet another object of the present invention is to provide the musician with an assembly for adjusting string height in a tremolo string instrument which is easy to install.

Still another object of the present invention is to provide the musician with a mechanism that can be installed in a wide range of stringed instruments including guitars.

And yet another objective of the present invention is to provide the user with a height adjustable point retention bar assembly which is mechanically reliable and yet very simple in construction and so it can be manufactured easily and inexpensively.

In the accompanying drawings, there is shown an illustrative embodiment of the invention from which these and other objectives, novel features and advantages will be readily apparent.

BRIEF DESCRIPTION OF THE DRAWINGS

FIG. 1 is a partially exploded front perspective view of a height adjustable point retention bar assembly showing the end caps in exploded view;

FIG. 2 is a top plan view of an end cap shown in FIG. 1;

FIG. 3 is a side perspective view of a support post with an adjustment screw;

FIG. 4 is an enlarged side elevational view of the point retention bar assembly;

DETAILED DESCRIPTION OF THE PREFERRED EMBODIMENT

Figure 5:
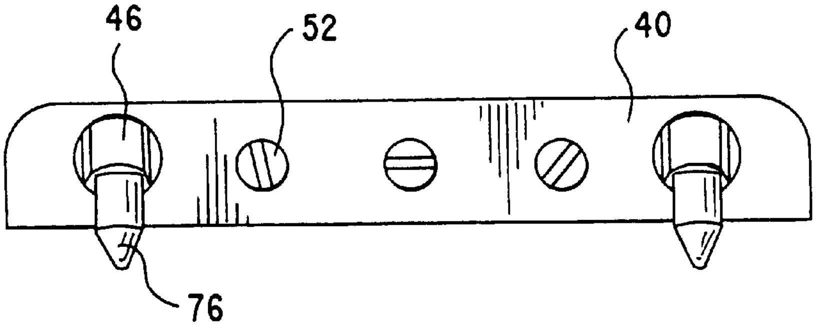
FIG. 5 is a top plan view of the height adjustable point retention bar assembly.
Figure 6:
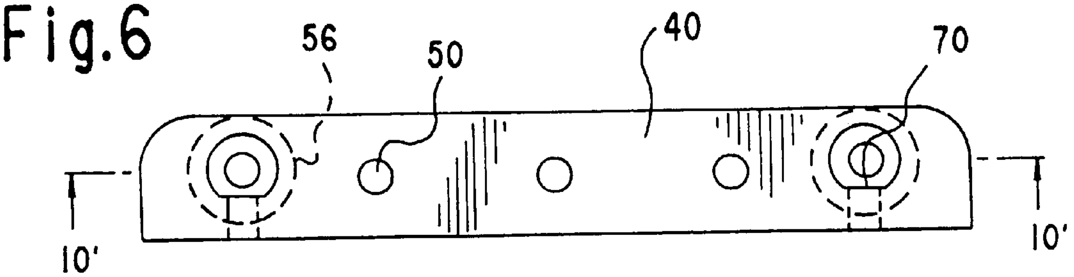
FIG. 6 is a top plan view of the height adjustable point retention bar of the height adjustable point retention bar assembly shown in FIG. 5 with the support posts removed.
Figure 12:
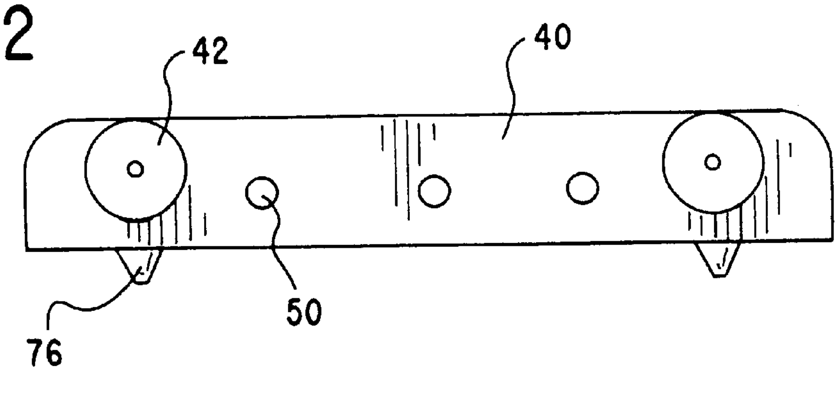
FIG. 12 is a bottom plan view of the height adjustable point retention bar assembly shown in FIG. 5.
Figure 7:
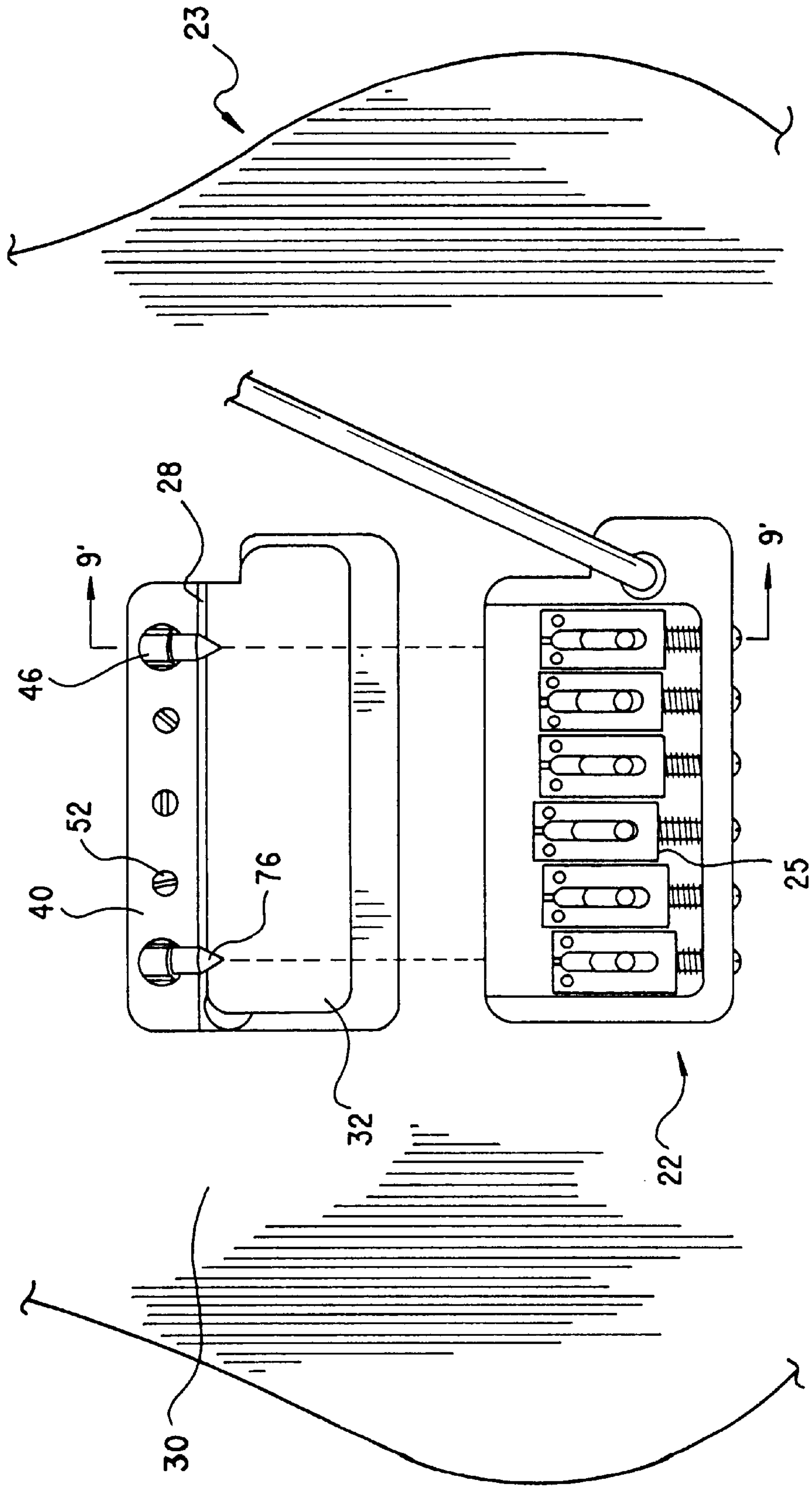
FIG. 7 is a partial top plan view of a routed guitar body showing the height adjustable point retention assembly mounted thereto with a pivoting portion of the tremolo in exploded view and a fragmentary view of a tremolo arm structure.
Figure 8:
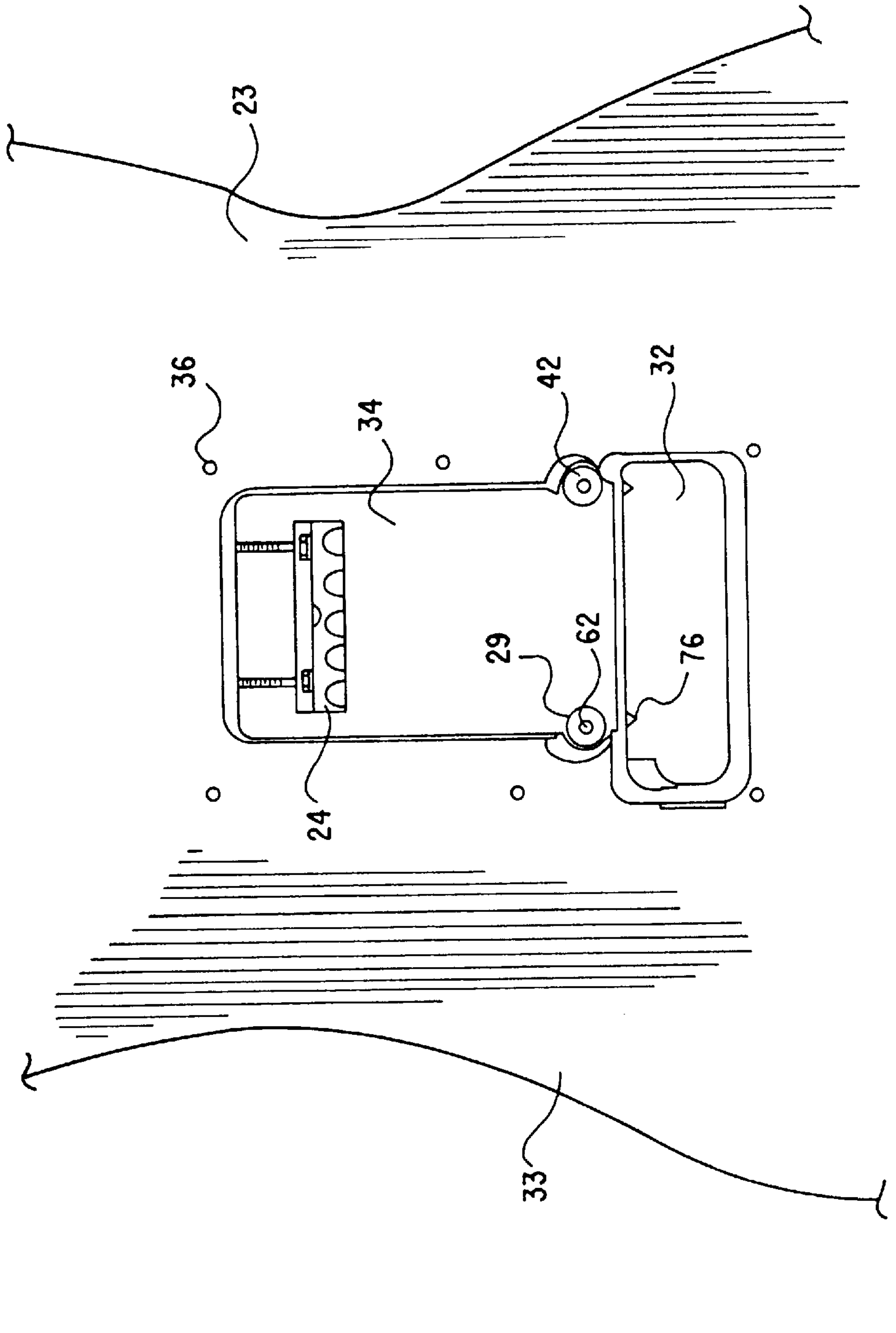
FIG. 8 is a partial bottom plan view of a routed guitar body showing the height adjustable point retention assembly installed therein and a spring claw assembly for the tremolo mounted thereto.
Figure 13:
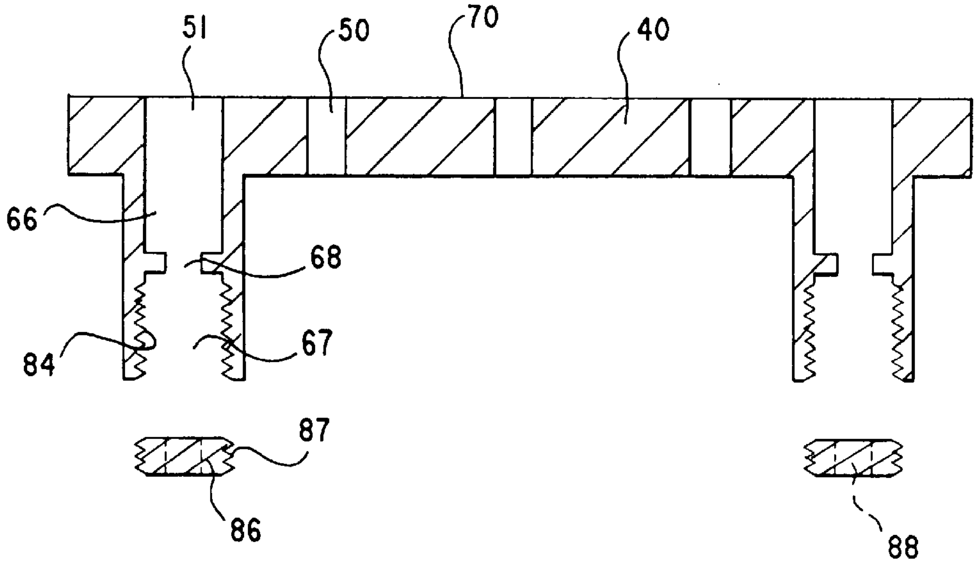
FIG. 13 is an enlarged cross sectional view of an alternative embodiment of the height adjustable point retention bar assembly showing an exploded view of the cylindrical threaded end member.

The preferred embodiment and best mode of the height adjustable point retention bar assembly 20, is shown in FIGS. 1, 2, 4, and 8 through 10 of the accompanying drawings. An alternative embodiment of the height adjustable point retention bar assembly is shown in FIGS. 11 through 13. FIGS. 3, 5, 6 and 7 are the same configuration for both the preferred and the alternative embodiment. The height adjustable point retention bar assembly 20 is typically secured to the body of a stringed instrument 100 and provides a plurality of pivot points about which a pivoting portion of a tremolo 22, rotates. A pivoting portion of a stringed instrument tremolo is disclosed and described in U.S. patent application Ser. No. 08/753,005 filed Nov. 19, 1996 which application is herein incorporated in its entirety. Preferably the height adjustable point retention bar assembly 20 is installed inside of the body 23 of a stringed instrument 100 which has been previously routed to receive the same. FIGS. 7 and 8 show a solid body guitar which has been routed to receive the height adjustable point retention bar assembly 20, the pivoting portion of the tremolo 22 and a claw assembly 24.

The top of the instrument is routed to form a recessed surface 28 below and essentially parallel to the top surface 30 of the instrument and a throughgoing body bore 32 which extends from the top surface 30 to the bottom surface 33 of the musical instrument body 23. The recessed surface 28 is provided with two cylindrical throughgoing bores 29 as best seen in the bottom view of the routed instrument body in FIG. 8. Preferably, the bottom surface of the instrument is routed to form a shallow spring chamber 34 which receives the claw assembly 24 and the plurality of coil springs 26. A plurality of threaded apertures 36 are formed in the bottom surface of the body of the instrument and receive a plurality of threaded fasteners 39 to removably secure a back plate cover 38 to the instrument.

Figure 9:
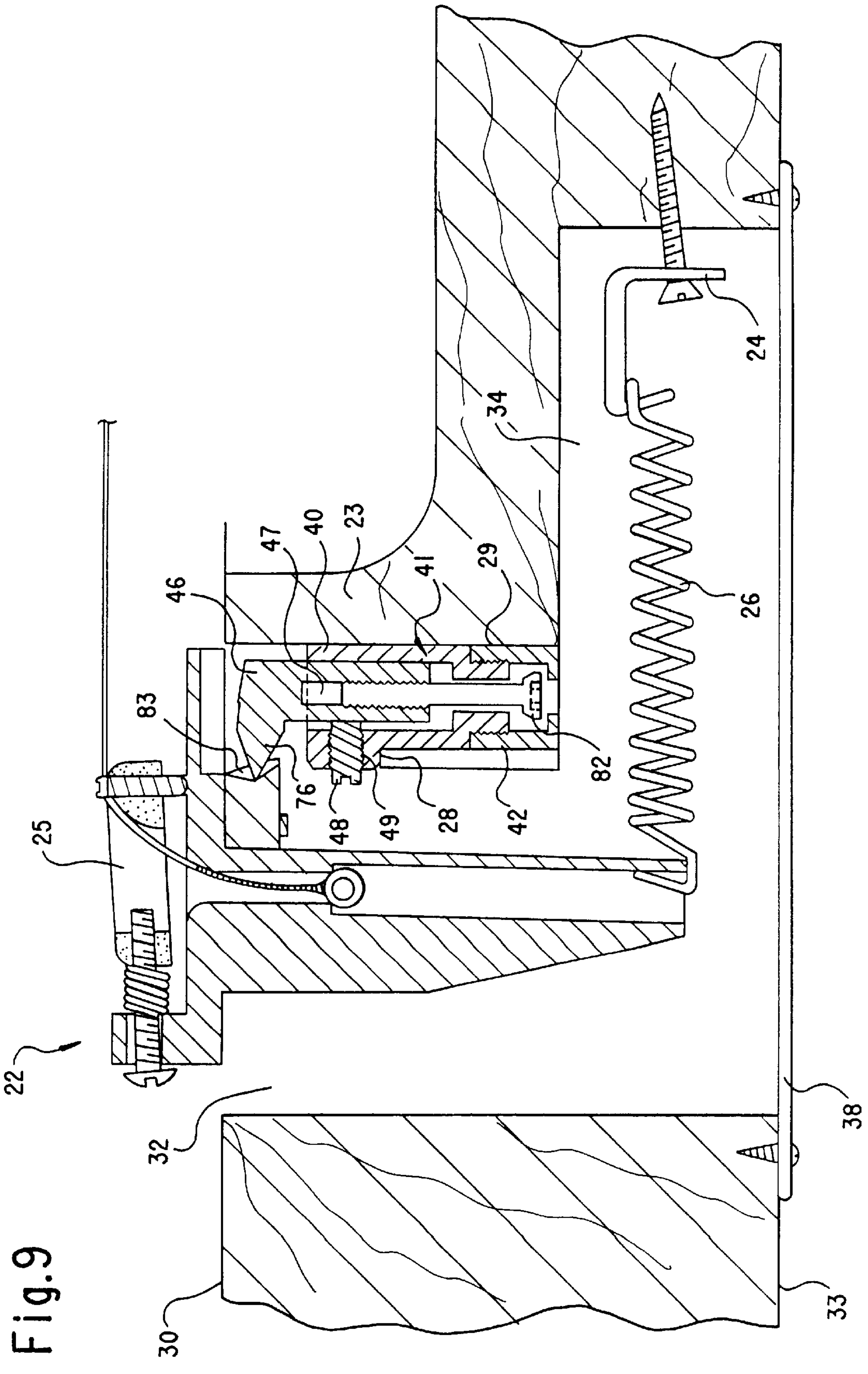
FIG. 9 is an enlarged cross sectional view showing the preferred embodiment of the height adjustable point retention bar assembly installed in a guitar body which is shown in fragmentary view.

The height adjustable point retention bar assembly 20 is installed on the recessed surface 28 which is cut or formed in the routed musical instrument body 23 as best seen in the cross sectional view in FIG. 9. The height adjustable point retention bar assembly 20 includes a height adjustable point retention bar 40, with post support seats 41 extending therefrom and a plurality of end cap members 42, which are fastened to one end of the post support seats. A support post 46 mounted in each post support seat has a height adjustment screw 44, threadably mounted in a threaded blind bore 47 cut in the base section of angular support post 46. The support posts 46 are held in a fixed position in the support seats 41 by engagement set screw 48. The height adjustable point retention bar 40 defines a plurality of throughgoing fastener bores 50 which receive a plurality of threaded fasteners 52 to secure the height adjustable point retention bar 40 to the recessed surface 28.

Each end of the height adjustable point retention bar 40 has integrally formed therewith downwardly extending post support seat members 41. The body of the support seat member defines a cylindrical chamber or bore 54, a shoulder 55, a smaller bore 56 and a recessed externally threaded distal end portion 58. A threaded set screw bore 49 is cut through the side wall of the support member 41 into the upper bore 54. The cylindrical end cap members 42 are each internally threaded to threadably engage the recessed threaded end portion 58 and each cap member defines an end cap aperture 62.

Figure 10:
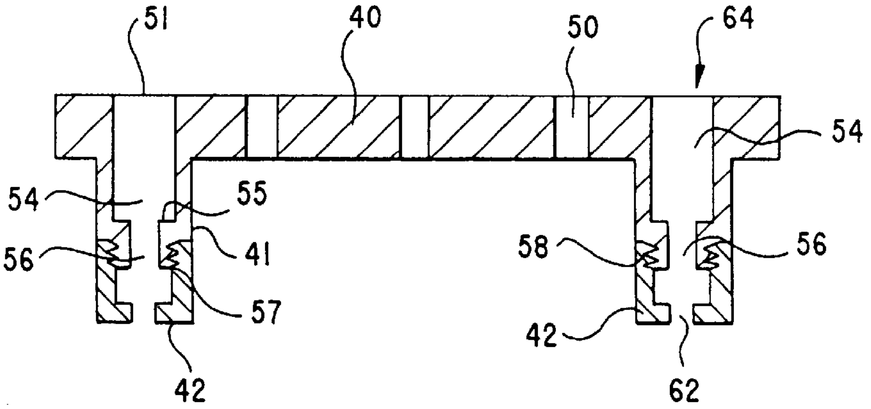
FIG. 10 is a cross sectional view of the preferred embodiment of the height adjustable point retention bar taken along line 10'—10' in FIG. 6.
Figure 11:
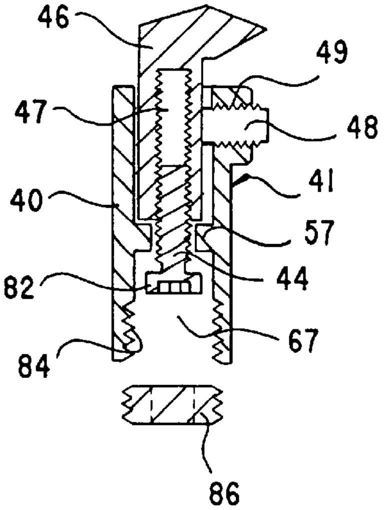
FIG. 11 is an enlarged cross sectional view showing an alternative embodiment of the height adjustable point retention bar assembly with a cylindrical threaded end member shown in exploded view.

As best viewed in the cross section shown in FIG. 10, each end of the height adjustable point retention bar 40 defines a vertically axially aligned fastener bores 50 and the end seat bores 51 leading into the support seat members 41. The bore 51 is formed with a stepped enlarged diameter upper portion 54, shoulder 55 and a smaller diameter lower portion 56. When the end cap members 42 are threadedly secured to the recessed threaded end portion 58 of the post support seat members 41, the end cap apertures 62 are axially aligned with the larger upper bore 54 and the smaller diameter lower bore 56 to form a continuous open passageway from the top of the height adjustable point retention bar 40 to the bottom of each end cap member 42. The outer surface of the post support seat member 41 is cylindrical while the proximal side 70 of the adjustable point retention bar is planar.

Each of the larger upper bore portions 54 slidably receives a support post 46. The bore housing is provided with a throughgoing threaded bore 49 which leads into bore portion 54 and threadedly receives an engagement set screw 48. When the engagement set screw 48 is tightened, the distal end engages the support post 46 and hold the same against the cylindrical inner wall of the bore portion 54 in a fixed position. The engagement set screw is preferably made of nylon but other materials can also be used. The engagement screws can be made from other composite or plastic materials and certain metals can also be used, but nylon is preferred because it provides good frictional engagement without becoming loose or damaging the metal of support post 46.

Each support post 46 has a base portion 72 which fits in bore portion 54 and an angularly extending arm portion 74 which terminates in a pointed cone 76. The base portion 72 of the support post 46 defines a threaded blind bore 47 that receives a height adjustment screw 44. When the support post 46 is positioned within the upper bore portion 54 and the end cap member 42 is removed from the threaded end 58, the height adjustment screw 44 can be inserted through the small diameter lower bore 56 to threadedly engage the threaded blind bore 47 of the base portion 72 of the support post 46. The screw is then screwed upward into the blind bore. The end cap member 42 can then be secured to the threaded end 58 of the post support member.

The height of the pointed cones 76 of the support posts 46 relative to the instrument body 23 can be adjusted by rotating the height adjustment screws 44. To raise the support posts 46, the user inserts a hand tool through the end cap aperture 62 to engage the torque receiving head 82 of the height adjustment screw 44. The head 82 of the height adjustment screw 44 is configured to receive a hand tool such as a screwdriver or an Allen wrench in a manner well known in the art. Preferably the head 82 defines a hexagonal opening to receive an Allen wrench. The height adjustment screw 44 is then rotated by a tool which extends through aperture 62 so that the head 82 advances toward the end cap member 42. The height of the pointed cone 76 does not change as the height adjustment screw 44 is moved toward the end cap member 42. When the head 82 impinges upon the end cap member 42, any further rotation of the height adjustment screw 44 in the same direction drives the support post 46 upwardly to raise the height of the conical point 76 and thus raise the string carriage 25. The support post 46 is then biased against a wall of the bore section 54 by the engagement set screw 48 and is held there by static frictional forces.

To lower the pointed cone 76, the set screw 48 is loosened and the height adjustment screw 44 is rotated in the opposite direction used to raise the pointed cone 76 until the head 82 impinges on the end surface 57 of the support seat member 41 which prevents further upward movement of the height adjustment screw 44. Further rotation lowers the cone point 76 of the support post 46. As can be seen in the bottom view of FIG. 8, the end cap apertures 62 are accessible through the two cylindrical bores 29. The cover structure 38 can be appropriately apertured to allow passage of the Allen wrench therethrough so that the height can be adjusted without removing the cover 38. FIG. 8 also shows the plurality of point portions 76 extending outwardly and distally over the cavity bore 32 in the body. These point portions (cones) are in position to receive and pivotally engage the recessed cone portions 83 of the pivoting or "floating" portion 22 of the tremolo as best seen in FIG. 9.

An alternative embodiment of the height adjustable point retention bar 40 is shown in FIGS. 11 and 13. In this embodiment, the exterior surface of each downwardly extending support seat member 41 is cylindrical and the lower portion 67 of throughgoing bore 66 is internally threaded as at 84 to threadedly receive a threaded disc member 86 which is externally threaded around its outer periphery 87. The threaded disc member 86 has a central throughgoing aperture 88 to accommodate a hand tool, preferably an Allen wrench, to allow passage of the same therethrough for rotational engagement with a height adjustment screw 44 in the manner identical to that previously described. The top or bottom surface of the disc member 86 can be slotted to receive a hand tool to facilitate the rotation of the disc member 86 when it is interengaged with the internal threading of the support seat end member 41.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present invention as defined by the following claims:

I claim:

1. A height adjustable device for a tremolo, comprising:

a base member;

attachment means for securing said base member to a surface of a musical instrument;

a plurality of string height adjustment carrying support members slidably mounted on said base member to engage a string carriage of a tremolo allowing selection positioning of the height of the string carriage; and adjustment means for alternately frictionally holding and moving said string carriage with respect to said base member to raise or lower said string carriage of said tremolo to raise or lower the height of strings of a musical instrument.

2. A height adjustable device for a tremolo as claimed in claim 1 wherein said base member has a planar bottom surface with a plurality of integral seat housings, extending therefrom, each seat housing defining a throughgoing bore defining an enlarged upper portion and a smaller lower portion, each said string support member comprising an internally threaded base portion, a neck portion angularly extending from said base portion defining a conical tip structure at the end of the cylindrical neck portion, said base portion of said support structure being slidably disposed within said throughgoing bore and said adjustment means comprises a height adjustment screw means in threaded communication with said threaded base portion.

3. A height adjustable device for a tremolo as claimed in claim 2 wherein each height adjustment screw means comprises a head portion with torque receiving means and each seat housing includes an internally threaded end cap member threadedly engaged with an externally threaded portion of said seat housing such that the screw head portion is positioned between the distal end of the end cap member and the distal end of the seat housing.

4. A height adjustable device for a tremolo as claimed in claim 2 wherein said base member is a bar and said seat housings extend therefrom, each seat housing defining a bore extending therethrough including a set screw in communication with said bore for engagement with said point support structure seated said throughgoing bore.

5. A height adjustable device for a tremolo as claimed in claim 4 wherein said set screw is comprised of a resilient and flexible material.

6. A height adjustable device for a tremolo as claimed in claim 5 wherein said resilient and flexible material is nylon.

7. A height adjustable device for a tremolo as claimed in claim 1 wherein each said height adjustment support member comprises a post with an end section angled from the axis of said post.

8. A height adjustable for a tremolo as claimed in claim 7 wherein said end section defines a conical tip.

9. A height adjustable device for a tremolo as claimed in claim 7 wherein said post has a base cylindrical section defining a central axially aligned threaded blind bore.

10. A height adjustable device for a tremolo as claimed in claim 9 wherein a screw with a torque receiving head is threadedly mounted in said blind bore.

11. A height adjustable carrying device for a tremolo as claimed in claim 2 wherein said height adjustment screw means comprises an adjustment screw which defines a head portion and which is threadedly engaged with the internally threaded portion of said support structure and wherein said seat housing first cylindrical portion further defines an internally threaded end portion and a externally threaded end disc member defining a central aperture mounted in said end portion.

12. A height adjustable pivot point carrying apparatus for a tremolo, comprising:

a base member with support seat means;

attachment means for securing said base member to a surface of a musical instrument;

a plurality of post members mounted in said support seats means, each post member defining a post section and a point section angularly extending from said post section to pivotably engage a pivotable string carrying portion of said tremolo with said point section; and adjustment means for alternately frictionally holding and sliding said plurality of post members with respect to said support seat means to raise or lower said pivotable string carrying portion of said tremolo to selectively vary the height of strings from said musical instrument.

13. An adjustable pivot point carrying apparatus for a tremolo as claimed in claim 12 wherein said adjustment means comprises a frictional engagement screw threadedly engaged within a threaded bore formed in said post member.

14. An adjustable pivot point carrying apparatus for a tremolo as claimed in claim 12 including a set screw means made of resilient and flexible material.

15. An adjustable pivot point carrying apparatus for a tremolo as claimed in claim 14 wherein said resilient and flexible material is nylon.

16. An adjustable pivot point carrying apparatus for a tremolo as claimed in claim 12 wherein said support seat means comprises a cylindrical housing extending from said base member, said cylindrical housing defining a stepped throughgoing axially aligned bore and a threaded distal end.

17. An adjustable pivot point carrying apparatus for a tremolo as claimed in claim 12 wherein said support seat means comprises a cylindrical housing extending from said base member, said cylindrical housing defining a throughgoing bore with an internal rib means, the distal end of said cylindrical housing being threaded.

18. An adjustable pivot point carrying apparatus for a tremolo as claimed in claim 17 wherein said support seat means includes a disc with external threading, mounted to said cylindrical housing, said disc defining a central throughgoing bore.

19. An adjustable pivot point carrying apparatus for a tremolo as claimed in claim 16 wherein said support seat means includes a cap member adapted to be treaded on said threaded distal end.

20. A height adjustable pivot point carrying device for a tremolo, comprising:

a base plate with a plurality of seat means extending from said base plate, each seat means comprising a cylindrical housing defining a throughgoing bore and being threaded at its distal end, and threaded plug means threadedly mounted on said threaded distal end;

point support means mounted in said seat means, said point support means defining a post and a pointed portion angularly extending from said post, said post being slidably mounted in said seat means cylindrical housing bore to engage receive a pivotable string carrying portion of said tremolo with said pointed portion, said post defining a threaded blind bore with a height adjustment screw mounted in threaded blind bore to raise or lower said pivotable string carrying portion of said tremolo adjusting the height of said strings; and adjustment means for alternately frictionally holding said point support means in a fixed position in said cylindrical housing bore.

* * * * *